Jan. 28, 1964

C. J. HILL 3,119,144

POULTRY GIZZARD PEELING ROLLS

Filed Dec. 21, 1961

INVENTOR.
Earl J. Hill
BY
Darbo, Robertson & Vandenburgh
Attys.

United States Patent Office 3,119,144
Patented Jan. 28, 1964

3,119,144
POULTRY GIZZARD PEELING ROLLS
Carl J. Hill, Box 409, Canton, Ga.
Filed Dec. 21, 1961, Ser. No. 161,032
1 Claim. (Cl. 17—11)

The present invention relates to improvements in a poultry gizzard peeling machine.

In the original gizzard peeling machine a pair of rolls were employed. Each of the rolls had a plurality of annular projections that interdigitated with the projections of the other roll to achieve a "bite" or grasp on the membrane lining of the gizzard and to detach that membrane from the gizzard. A subsequent proposal for a machine for the same purpose, employed a pair of rolls having spiral projections that engaged the projections of the other roll much in the form of helical gears. In this machine the projections had a very small pitch, i.e. the projections were at only a slight angle from planes normal to the axis of the roll.

I have discovered, contrary to previous belief, that rolls which take the form of spiral gears with a very substantial pitch are extremely effective as gizzard peelers. They perform an exceptional workmanlike job of removing the gizzard lining and there is little necessity for repeating the operation on already processed gizzards so as to remove remnants of the lining that were missed in the initial peeling operation. The pitch of the rolls of the type herein discussed should be in excess of twice the external diameter of the rolls.

However, with gizzard peelers which are loaded and unloaded by hand the large pitch helical gear rolls have some disadvantages. In the first place, the gizzard tends to move to one end of the pair of rolls because of the substantial pitch of the gears. If the operator does not lift the gizzard off of the rolls before it reaches the end, the gizzard is likely to be turned over when it reaches the wall at the end of the rolls. Of course, that wall is put there for the purpose of preventing the gizzard from falling down into the roll bearings and getting greasy, etc. If the gizzard turns over it will be contaminated (as that term is employed by health inspection officials). Even when the operator endeavors to retain a grasp of the gizzard while it is being peeled, the action of the gears is such that they actually may pull the gizzard out of the operator's grasp.

A principal object of the present invention is to provide a pair of peeling rolls for gizzard processing machines that overcome the foregoing problems of the prior art. The rolls I have devised are intended particularly for machines in which the gizzard is placed manually upon and removed from the peeling rolls. My invention retains the advantage of effective peeling of the helical gears, while at the same time overcomes the disadvantages discussed with respect to hand-operated machines. In many instances it peels the gizzard lining more effectively than will a simple pair of helical gears by reason of the opposed peeling forces that are applied to the gizzard lining by the opposite sides of the two gears. It has the additional advantage that a separate gearbox need not be employed for the peeling rolls. If power is applied to one roll, that roll automatically drives the other roll with no end thrust, etc., on the bearings.

Further objects and advantages will be apparent from the following description taken in conjunction with the drawings in which.

Figure 1:
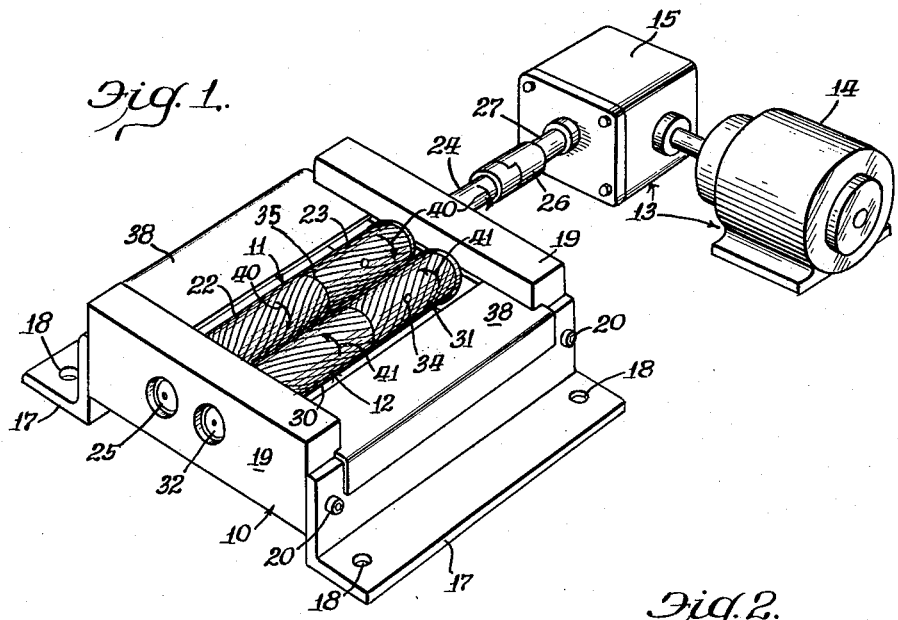
FIGURE 1 is a perspective view of an embodiment of my invention.

The embodiment of FIGURE 1 includes a frame generally 10, a pair of rolls generally 11 and 12 and a power means generally 13. While the power means 13 may take a variety of forms, for the purposes of illustration it comprises a motor 14 and a speed reduction gearbox 15.

Frame 10 comprises a pair of angles 17 having openings 18 by which the frame may be affixed to a suitable support (not shown). A pair of bearing blocks 19 are secured to angles 17 by means of screws 20. Bronze bearings 21 are mounted in bearing blocks 19. The two rolls 11 and 12 are journaled in bearings 21.

Roll 11 is formed in two segments 22 and 23 the adjacent ends of which lie in a plane 35. Segment 22 is integral with drive shaft 24 and with stub shaft 25, both of which are journaled in bearings 21. By means of a coupling 26 drive shaft 24 is connected to the output shaft 27 of gearbox 15. The periphery of segment 22 defines a spiral gear whose threads have a substantial pitch. Segment 23 is annular in shape and is mounted on drive shaft portion 24 by means of a pin 28. The surface of segment 23 also is in the configuration of a spiral gear.

The structure of roll 12 generally conforms to that described with respect to roll 11. Roll 12 comprises two segments 30 and 31 also meeting in plane 35. Segment 12 has two stub shafts 32 and 33 journaled in bearings 21. Segment 21 is affixed to stub shaft 33 by means of a pin 34.

Figure 2:
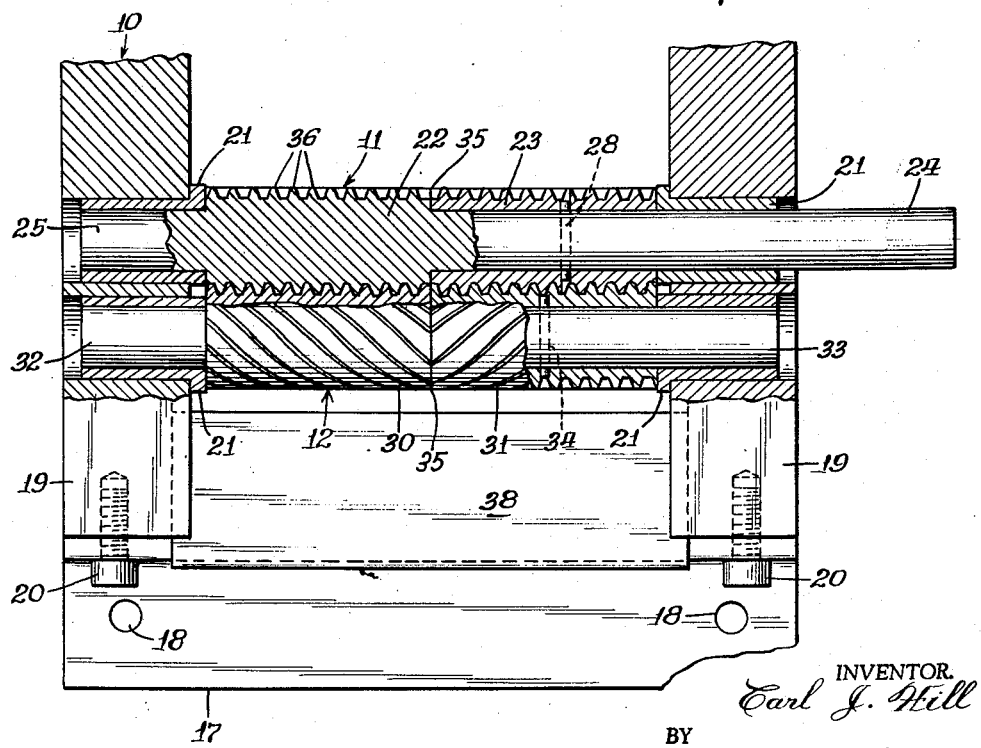
FIGURE 2 is an enlarged partial plan view with portions of the embodiment in section.

Segments 22 and 30 of rolls 11 and 12 define intermeshing helical gears having a substantial pitch. Segments 23 and 31 of the rolls define helical gears of the same pitch, but with the spiral being the reverse of that on segments 22 and 30 respectively, whereby when the segments are assembled, as illustrated in FIGURES 1 and 2, the assembled rolls have the configuration of a pair of herringbone gears. Of course, as best illustrated in FIGURE 2, the teeth of each of the gears intermesh with the teeth of the other of the gears. The pitch of the teeth, e.g. teeth 36 of segment 22, must have a pitch which is in excess of twice the external diameter of the rolls (as defined by the surface of the teeth 36) to perform in accordance with my invention. In the illustrated embodiment, which represents a particularly effective embodiment, the pitch of the teeth is approximately four times the external diameter of the rolls.

Immediately adjacent each side of the pair of rolls are support plates 38. The upper surface of support plates 38 is parallel to the two rolls and is at approximately the same elevation (preferably just slightly lower) than the plane defined by the upper surfaces of the two rolls 11 and 12.

In use, the power means 13 rotates roll 11 in a direction indicated by arrows 40. The intermeshing gear action between roll 11 and roll 12 results in the rotation of roll 12 in the direction indicated by arrows 41. The embodiment is mounted so that the plane defined by the upper surfaces of plates 38 is approximately horizontal.

An operator takes a split and cleaned gizzard and holds it in contact with the upper surfaces of the rolls at approximately the plane 35 defined by the contacting ends of the segments of the rolls (the left end of segment 23 and the right end of segment 22, etc.). Because of the unusual configuration of the rolls I have devised the gizzard does not tend to move towards one end or the other of the rolls, but will remain substantially centered. The intermeshing teeth of the two rolls engage the membrane lining the interior of the gizzard (i.e. the surface of the gizzard now facing the rolls as the operator places the gizzard on the rolls), and pulls the membrane away from the body of the gizzard.

The segments at one side of the plane 35 defining the center of the two rolls, tends to pull the portion of the membrane that it grasps in one direction, while the other portions of the two rolls tend to pull the part of the membrane that it grasps in the opposite direction. For example, referring to FIGURE 2 with a gizzard on top of the two rolls 11 and 12, the portions of the membrane grasped by portions 23 and 31 of the two rolls is pulled away from the viewer, i.e. into the plane of the sheet, and to the right. However, the two left hand portions 22 and 30 grasp a part of the membrane and act to pull it away from the viewer and to the left in FIGURE 2. This pulling of the membrane in opposite directions, i.e. towards the right and left in FIGURE 2, performs a particularly effective peeling action. At the same time, the opposing forces tend to balance each other so that the gizzard is not pulled one direction or the other out of the grasp of the operator. The operator may easily move the gizzard forwardly and back, i.e. parallel to the plane of demarcation between the two segments of each of the rolls, to make sure that the entire lining is subjected to the peeling action of the device. When a membrane has been entirely removed the operator merely lifts the gizzard from the rolls and substitutes an unpeeled gizzard.

The foregoing description of a specific embodiment is for the purposes of complying with 35 USC 112 and should not be construed as imposing unnecessary limitations upon the appended claim. Modifications and variations thereof will be apparent to those skilled in the art or subsequently devised by them. For example, the teeth of each of the rolls could be cut from a single blank rather than being formed in separate units and then assembled as illustrated and described in connection with the FIGURES 1 and 2. In some embodiments the number of segments making up each of the herringbone rolls could be in excess of two. For example, three segments could be employed with two reversals of the direction of pitch occurring between the ends of a roll rather than the one reversal of the described embodiment.

I claim:

A gizzard peeler including: a frame; a pair of gears journaled on the frame, each gear having teeth positioned in a herringobne configuration with two segments divided by a plane of demarcation with the pitch of the teeth of one segment being opposite to the pitch of the teeth of the other segment, the teeth of one gear being in engagement with the teeth of the other gear, said gears being positioned side by side and in the same horizontal plane; power means connected to one of said gears to rotate said gear which in turn rotates the other gear; and support means at opposite sides of the pair of gears and approximately coplanar with the top of the two gears; whereby when a split gizzard is deposited with the gizzard lining overlapping the plane of demarcation, the pulling force on the lining applied by one segment will be in a direction different from the direction of the pulling force applied by the other segment.

References Cited in the file of this patent

UNITED STATES PATENTS

| | | |
|---|---|---|
| 2,630,599 | Grant et al. | Mar. 10, 1953 |
| 2,861,293 | Platt | Nov. 25, 1958 |
| 2,908,935 | Shrader | Oct. 20, 1959 |